United States Patent
Araki

(10) Patent No.: US 8,245,197 B2
(45) Date of Patent: Aug. 14, 2012

(54) PROGRAM MONITORING METHOD, COMPUTER, AND ABNORMAL MONITORING PROGRAM PRODUCT

(75) Inventor: Kenichi Araki, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1359 days.

(21) Appl. No.: 11/832,484

(22) Filed: Aug. 1, 2007

(65) Prior Publication Data

US 2008/0040707 A1 Feb. 14, 2008

(30) Foreign Application Priority Data

Aug. 9, 2006 (JP) ................. 2006-217241

(51) Int. Cl.
 *G06F 9/44* (2006.01)
(52) U.S. Cl. ...................................... 717/127
(58) Field of Classification Search ............ 717/127
 See application file for complete search history.

(56) References Cited

U.S. PATENT DOCUMENTS

| 6,658,602 | B1 * | 12/2003 | Nakano ............... 714/38.1 |
| 2004/0078784 | A1 * | 4/2004 | Bates et al. ............. 717/129 |
| 2007/0277155 | A1 * | 11/2007 | Casey ................. 717/124 |

FOREIGN PATENT DOCUMENTS

| EP | 0590637 | 4/1994 |
| JP | 60-72039 | 4/1985 |
| JP | 62098435 | 5/1987 |
| JP | 63250740 | 10/1988 |
| JP | 1-94450 | 4/1989 |
| JP | 4332055 | 11/1992 |
| JP | 6-149626 | 5/1994 |
| JP | 6168163 | 6/1994 |

OTHER PUBLICATIONS

Japanese Office Action dated Aug. 30, 2011, from corresponding Japanese Application No. 2006-217241.

* cited by examiner

*Primary Examiner* — Wei Zhen
*Assistant Examiner* — Lanny Ung
(74) *Attorney, Agent, or Firm* — Katten Muchin Rosenman LLP

(57) ABSTRACT

A program monitoring method includes the steps of describing an operating point code (2P) indicating an operating point value (3P) in one or more locations of a module (1M), counting the operating point value (3P) indicated by the operating point code (2P) by a counter if an execution position becomes the location of the operating point code (2P) while the module (1M) is being executed, and deciding that the module (1M) has not been executed normally if a difference between the numerical value counted by the counter and a score value (3S) is not a predetermined numerical value.

6 Claims, 11 Drawing Sheets

PROGRAM MONITORING METHOD, COMPUTER, AND ABNORMAL MONITORING PROGRAM PRODUCT

BACKGROUND OF THE INVENTION

1. Field of the Invention

The present invention relates to a method and the like for monitoring whether or not a program has been executed normally.

2. Description of the Prior Art

Conventionally, there are proposed methods for monitoring whether or not a program has been executed normally in a computer.

Japanese unexamined patent publication No. 63-250740 describes a method that uses an intermodule call table for storing a branch address, an upper limit address, a lower limit address, a module type and a hierarchical level that are set for each entry between a plurality of firmware modules, an execution type register for assigning a type number to each of the firmware modules and for keeping a type that is being executed, an execution level register for providing a hierarchical level that indicates a hierarchical structure of the firmware intermodule and for keeping a level that is being executed, upper limit and lower limit register portions for storing the upper limit address and the lower limit address respectively, and a detecting portion for detecting that the branch address of a branch command that has an address of the intermodule call table in the firmware module and can read out the module type and the hierarchical level is outside a range enclosed by the upper limit address and the lower limit address, and for detecting invalidity of the module type and the hierarchical level.

Japanese unexamined patent publication No. 4-332055 describes a method in which a unique program number is assigned to each of the programs that work in a linking manner in a computer system, a reference table 26 is provided for recording a start address and an area size of each program on the memory 25, a called side program reads out a return address from a stack 24, and a number of a calling side program and a number of the called side program are determined from the reference table 26 and are saved in the stack 24 before a primary process is executed. After the execution of the process has been finished, the number of the called side program is read out from the stack 24 and is compared with a number of its own program. Only if the numbers match each other and if an address range of the calling side program determined from the number of the calling side program and the reference table includes the return address, the operation can return to the calling side program.

Japanese unexamined patent publication No. 6-168163 describes a method in which a CPU 12 monitors a period of a lap time pulse LTP that is delivered from a loop start end of a program. When this pulse period is deviated from a normal range, a loop process sequence abnormal signal is produced so that run-away can be detected from the abnormal loop process period. In addition, the CPU 12 monitors a flag pulse FP that is produced every time when a step embedded in a key point in the program is executed. If an integrated value of the flag pulse FP does not match a normal value at the time point when a predetermined number of loops have been executed, a step process sequence abnormal signal is produced for a CPU monitor device 11 to monitor the CPU concerning its executing status of the program.

However, the conventional methods described above have problems as follows. According to the method described in Japanese unexamined patent publication No. 63-250740, it is necessary to manage information about a relationship between firmware modules resulting in a complicated mechanism.

According to the method described in Japanese unexamined patent publication No. 4-332055, it is possible to detect whether or not a program is running away at the time point when a link process of the program is performed. However, it is difficult to decide whether or not one program has been executed normally.

According to the method described in Japanese unexamined patent publication No. 6-168163, it is difficult to detect an abnormal unexecuted state of a code to be executed.

SUMMARY OF THE INVENTION

An object of the present invention is to facilitate monitoring whether or not one program has been executed normally compared to the conventional structures.

A program monitoring method according to an aspect of the present invention is a method for monitoring whether or not a program has been executed normally. The method includes the steps of describing a code indicating a first numerical value in one or more locations of the program in advance, counting the first numerical value indicated by the code by a counter if an execution position becomes the location while the program is being executed, and deciding that the program has not been executed normally if a difference between a numerical value counted by the counter and a second numerical value is not a predetermined numerical value.

Preferably, the first numerical values of the codes may be described differently in the locations of the program.

In addition, the counter may be prepared for each of a plurality of programs that are executed in the same time period, and if the execution position becomes the location while the program is being executed, the first numerical value indicated by the code may be counted by the counter of the program.

According to the present invention, whether or not one program has been executed normally can be monitored more easily than the conventional method. According to the second aspect of the present invention, it is easy to estimate which location of the program generated the abnormal state. According to the third aspect of the present invention, it is easy to monitor programs performed by a computer that activates a plurality of programs in the same time period.

DESCRIPTION OF THE PREFERRED EMBODIMENTS

The invention will now be described in detail with reference to the attached drawings.

Figure 1A:
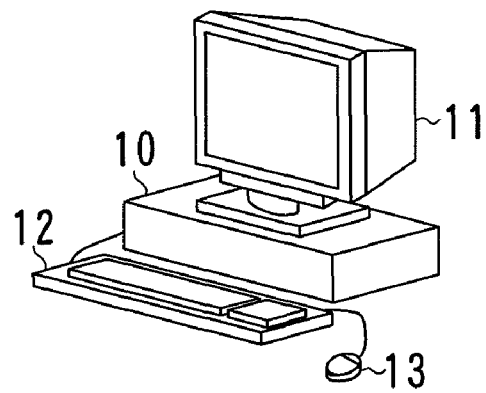
FIGS. 1A and 1B are diagrams showing an example of an appearance of a computer and a hardware structure thereof.
Figure 1B:
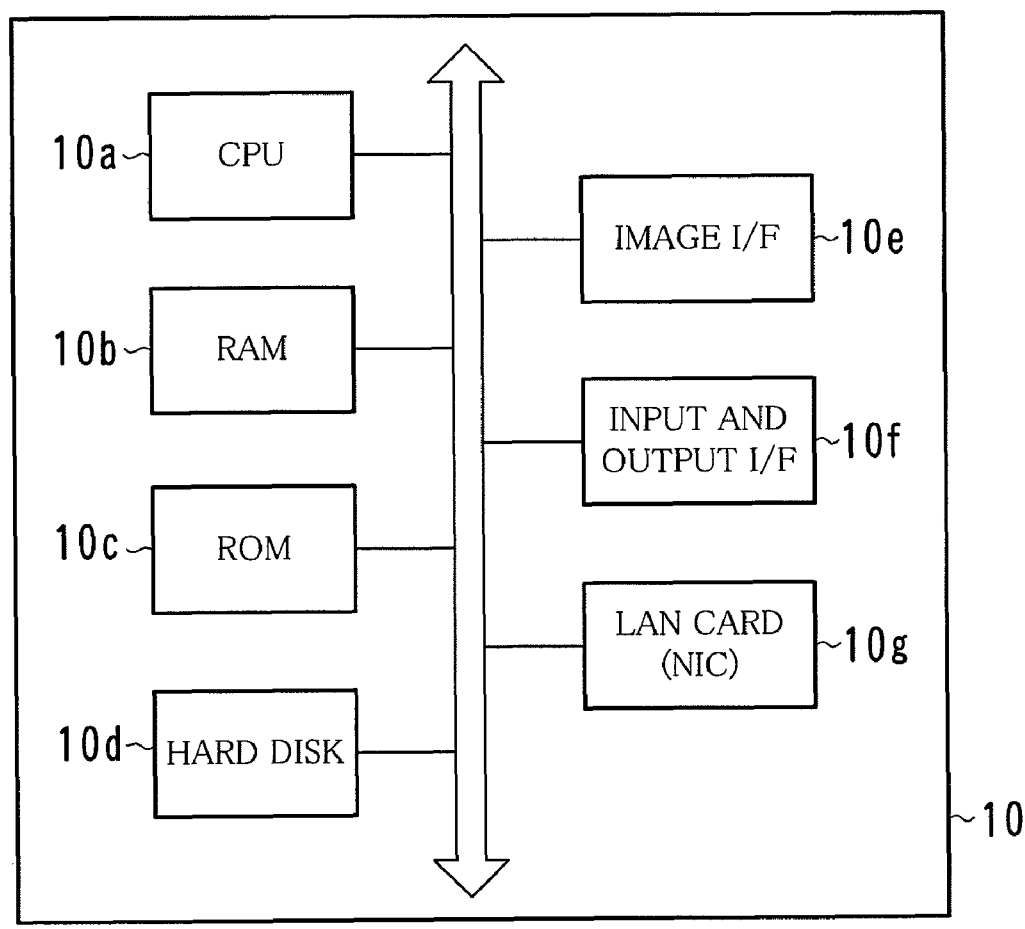
Figure 2:
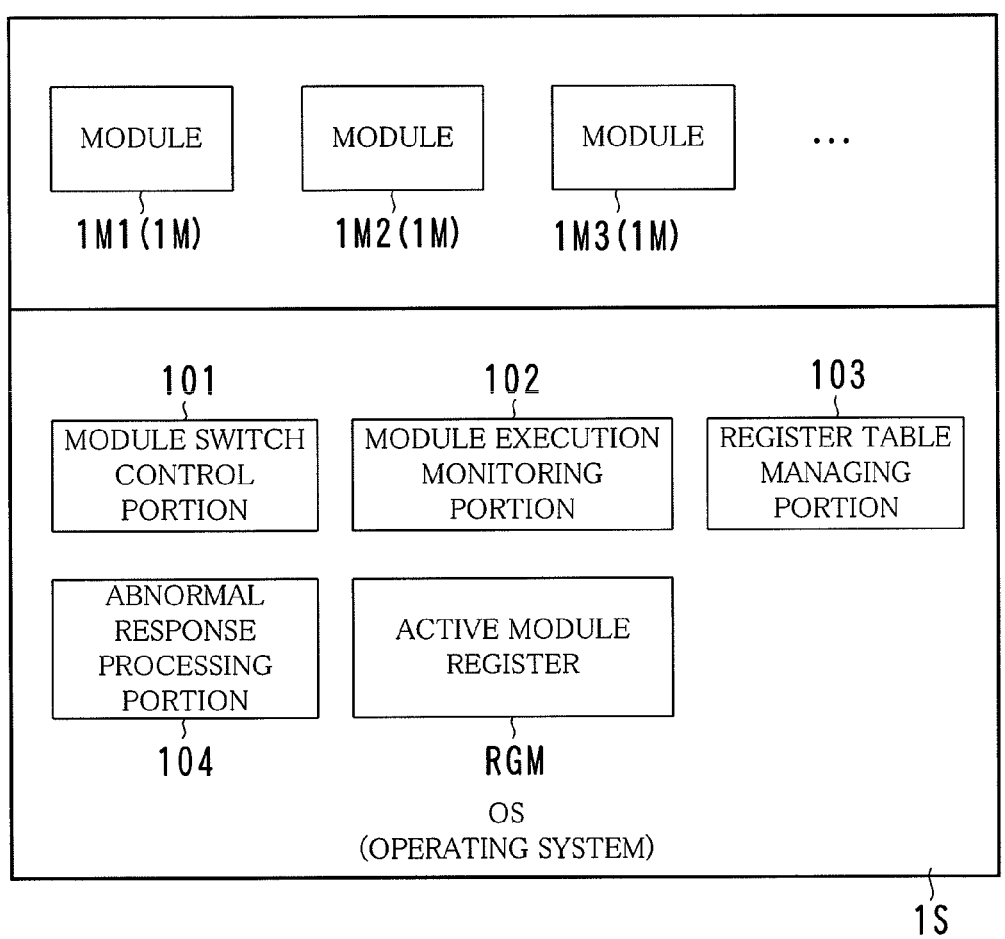
FIG. 2 is a diagram showing an example of a structure of software installed in a computer.
Figure 3:
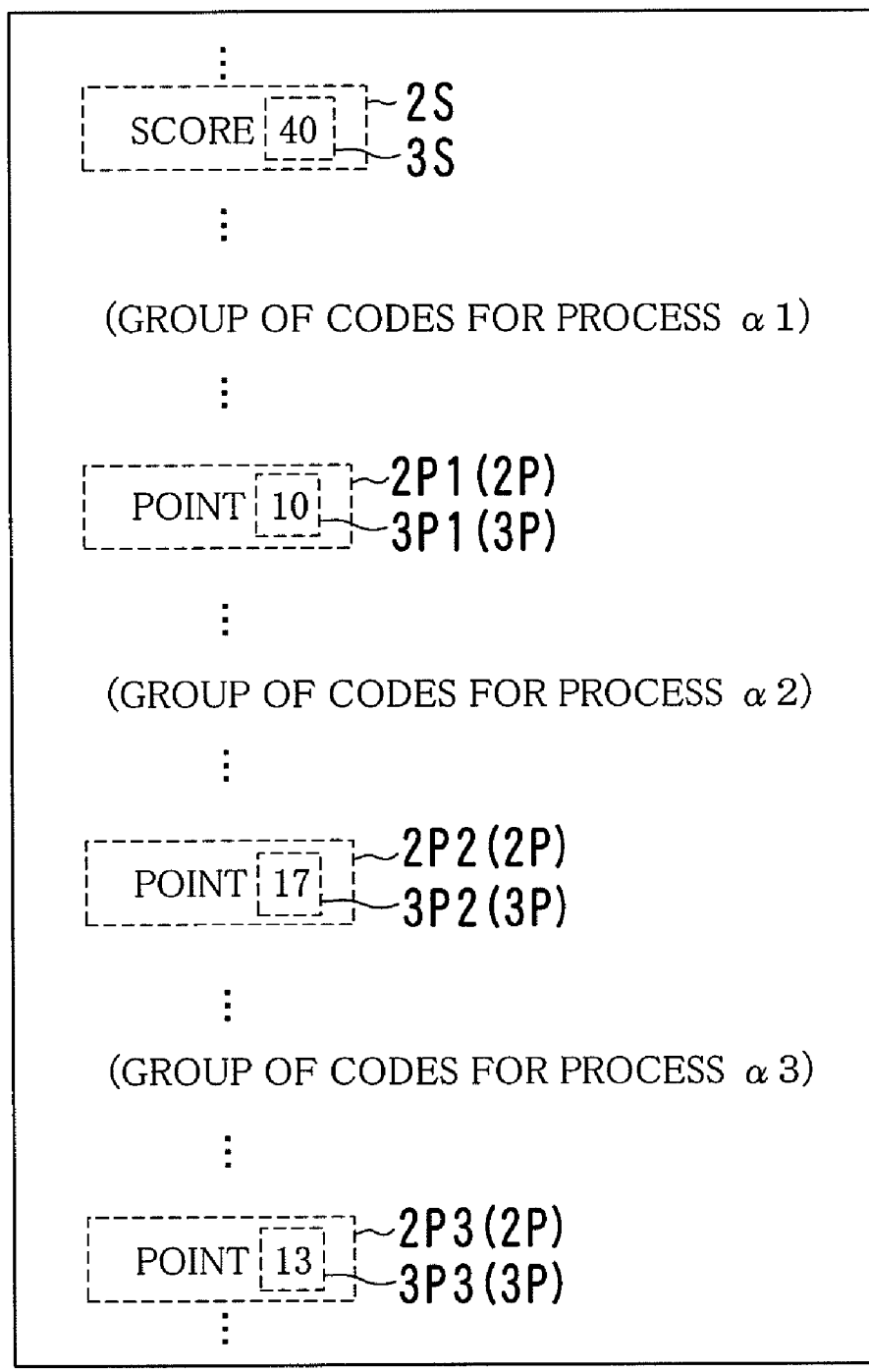
FIG. 3 is a diagram showing an example of a structure of a module.

FIGS. 1A and 1B are diagrams an example of an appearance of a computer 1 and a hardware structure thereof, FIG. 2 is a diagram showing an example of a structure of software installed in the computer 1, and FIG. 3 is a diagram showing an example of a structure of a module 1M.

As shown in FIG. 1A, the computer 1 is made up of a computer main body 10, a display 11, a keyboard 12, a mouse 13 and the like.

As shown in FIG. 1B, the computer main body 10 is made up of a CPU 10a, a RAM 10b, a ROM 10c, a hard disk 10d, an image interface 10e, an input and output interface 10f, a LAN card 10g and the like. As the computer 1, a personal computer, a workstation or the like is used. In the present embodiment, the case where the computer 1 includes the single CPU 10a will be described.

As shown in FIG. 2, an operating system 1S and a plurality of modules 1M and the like are installed in the hard disk 10d.

The operating system 1S provides management of the entire system of the computer 1, a fundamental user interface and the like. In particular, the operating system 1S of the computer 1 according to the present embodiment includes programs and data for realizing functions of a module switch control portion 101, a module execution monitoring portion 102, a register table managing portion 103, an abnormal response processing portion 104 and the like.

Each of the modules 1M is a program for the computer 1 to realize a practical function. In addition, two types of codes for performing a monitoring process according to the program monitoring method of the present invention are embedded in each of the modules 1M at one or more locations as shown in FIG. 3.

One type of the codes indicates a character string "POINT" and a constant value. Hereinafter, this code is referred to as an "operating point code 2P", and the constant value is referred to as an "operating point value 3P".

The other type of the codes indicates a character string "SCORE" and a constant value. This constant value is a total sum of the operating point value 3P indicated by the operating point code 2P that is referred to when the module 1M has been executed normally. If the same operating point code 2P is referred to for a plurality of times when the module 1M is executed, the operating point value 3P of the operating point code 2P is summed up for the number of times. Hereinafter, this code is referred to as a "score code 2S", and the constant value is referred to as a "score value 3S".

The operating point code 2P and the score code 2S may be embedded when a coding operation of the module 1M is performed, but it is possible to embed a new module 1M in the existing module 1M. In this case, contents of the module 1M should be displayed on the display 11 so that a user can designate any location where the operating point code 2P is embedded. Alternatively, it is possible to adopt a structure in which the user can designate also any operating point value 3P of the operating point code 2P. The score code 2S should be embedded in a predetermined location automatically. The score value 3S of the score code 2S should be decided based on each operating point value 3P.

In what ways the operating point code 2P and the score code 2S are used will be described later.

The operating system 1S and each module 1M are loaded to the RAM 10b as necessity and are executed by the CPU 10a.

Figure 4:
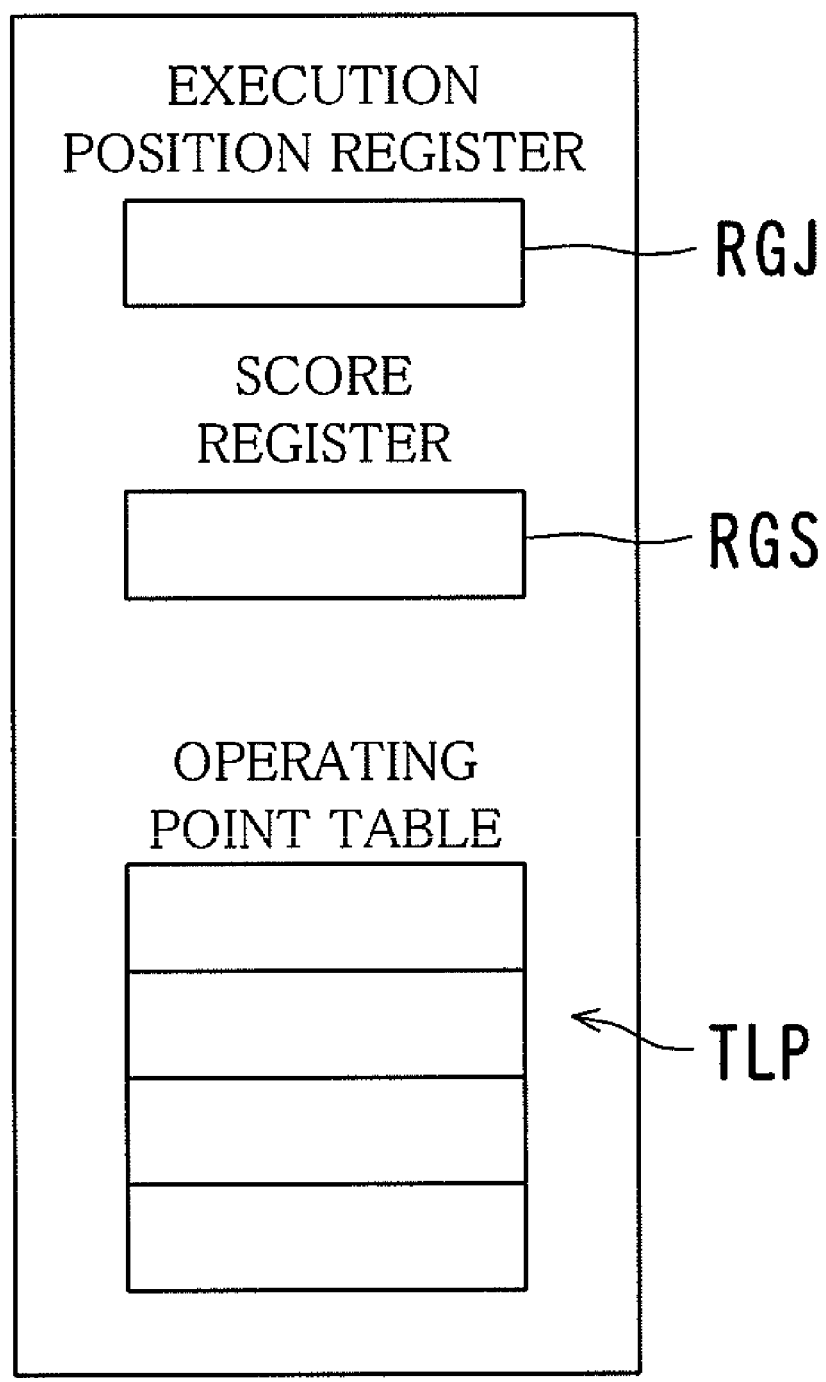
FIG. 4 is a diagram showing an example of a combination of a register and a table prepared for one module.
Figure 5:
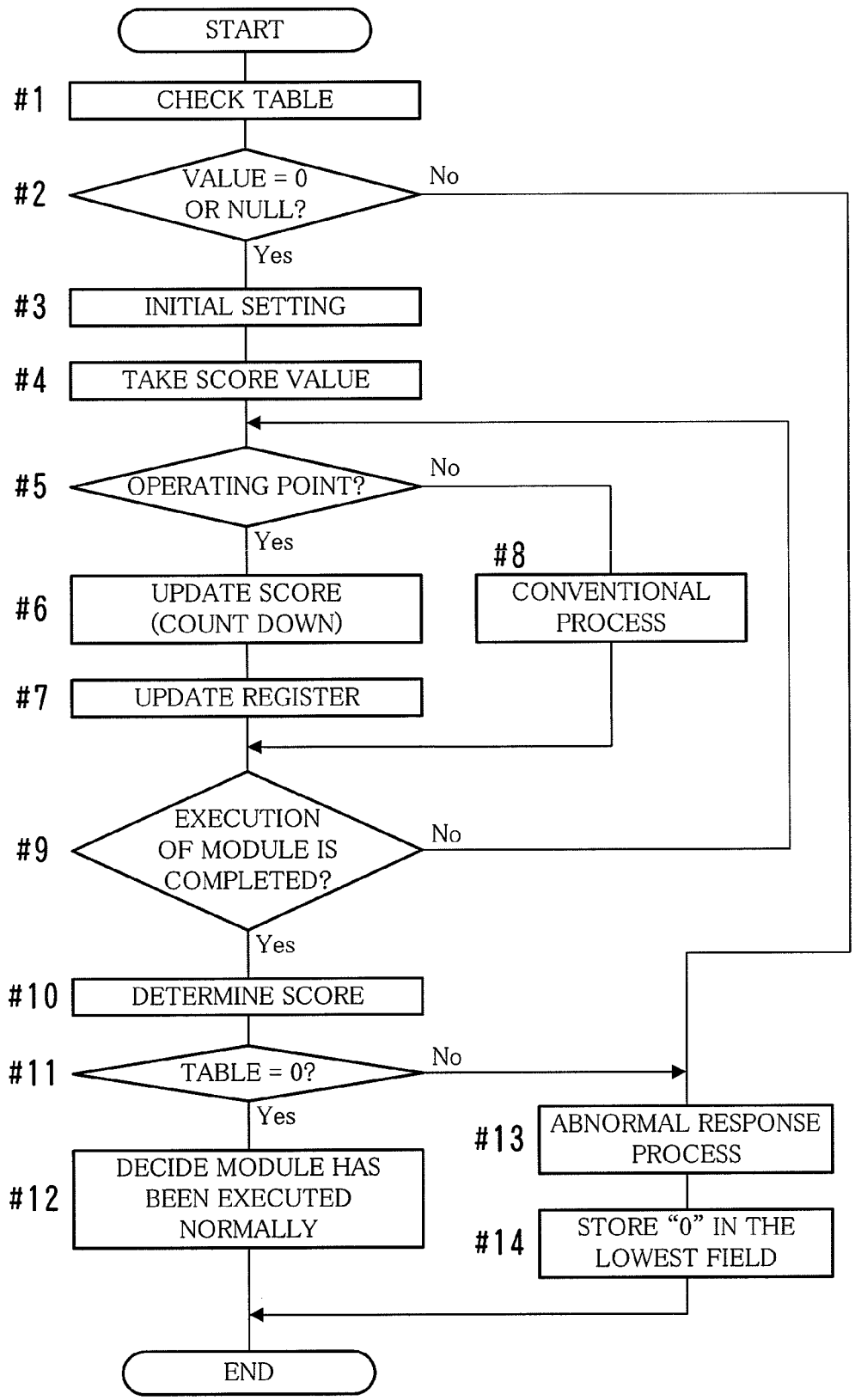
FIG. 5 is a flowchart for explaining an example of a flow of a process of monitoring execution of a module.

FIG. 4 is a diagram showing an example of a combination of a register and a table prepared for one module 1M, and FIG. 5 is a flowchart for explaining an example of a flow of a process of monitoring execution of the module 1M.

Next, functions of individual portions shown in FIG. 2 will be described in detail.

The module switch control portion 101 performs control for switching the modules 1M that are executed by the CPU 10a when a plurality of modules 1M are activated. In other words, a multitasking process is performed. The switching method can be any one of the preemptive multitasking method or a pseudo multitasking method.

The module execution monitoring portion 102 monitors whether or not the module 1M has been executed normally. The register table managing portion 103 prepares and manages a set of an execution position register RGJ, a score register RGS and an operating point table TLP as shown in FIG. 4 for each module 1M to be monitored. Further, it manages an active module register RGM that indicates which module is being executed at present by the CPU 10a (in other words, which module 1M is active).

The abnormal response processing portion 104 performs a process for dealing with the abnormal state of the module 1M when the module execution monitoring portion 102 detected that the module 1M is not executed normally, i.e., that it is in the abnormal state.

The module execution monitoring portion 102, the register table managing portion 103, and the abnormal response processing portion 104 perform the processes for monitoring the module 1M and for dealing with the abnormal state in the procedure as shown in the flowchart of FIG. 5.

When the module 1M is activated, the module execution monitoring portion 102 checks whether or not a value of the lowest field among the fields filled with any numerical value in the operating point table TLP of the module 1M (hereinafter referred to as "the lowest field of the operating point table TLP") is "0" (#1). As described later, if the execution of the module 1M is finished normally, "0" is stored in the lowest field of the operating point table TLP. Therefore, if it is not "0", it is considered that the process for dealing with the abnormal state was not performed in spite of the occurrence of the abnormal state while the module 1M was executed last time. The cause of it is considered to be a recall or an invalid jump while the module 1M is being executed. However, if the module 1M is executed for the first time, every field of the operating point table TLP is blank.

Therefore, if a certain numerical value is stored in any one of fields of the operating point table TLP and if the lowest field of the operating point table TLP is not "0" (No in #2), the abnormal response processing portion 104 performs the process for dealing with the last abnormal state of the module 1M (#13). Contents of the process will be described later.

On the other hand, if the lowest field of the operating point table TLP is "0" or if every field of the operating point table TLP is blank (Yes in #2), the register table managing portion 103 resets every field of the execution position register RGJ, the score register RGS and the operating point table TLP of the module 1M to be blank for initial setting (#3). Then, it takes the score value 3S of the score code 2S of the module 1M (see FIG. 3) into the leading field of the operating point table TLP (#4). Then, execution of the module 1M is started. At this time point, the lowest field of the operating point table TLP is a field into which the score value 3S is taken.

In principle, the codes described in the module 1M are executed in accordance with the rule of the description language of the module 1M in the conventional manner.

Therefore, if the code in the execution position is neither the score code 2S nor the operating point code 2P (No in #5), the process in accordance with the code is performed in the conventional manner (#8).

However, if the code in the execution position is the operating point code 2P (Yes in #5), the register table managing portion 103 fills its lower field with a value obtained by subtracting the operating point value 3P of the operating point code 2P from the value in the lowest field of the current operating point table TLP (#6). In other words, it is counted down from the latest value of the operating point table TLP by the operating point value 3P. In this way, the operating point table TLP plays a role of a counter. On this occasion, the operating point value 3P is stored in the score register RGS of the module 1M (#7).

Every time when the execution position is moved during execution of the module 1M, information that indicates the moved position is stored in the execution position register RGJ of the module 1M. In this way, the execution position register RGJ plays a role of a pointer of the module 1M.

If a certain value is already stored in the execution position register RGJ and the score register RGS, the value is deleted, and the latest execution position and operating point value 3P are stored newly. In other words, they are overwritten. In addition, an address, a line number or the like can be used as information that indicates the execution position. Alternatively, a comment text that is described with a code such as "'", "/*", "REM" or the like.

Until the execution of the module 1M is completed (No in #9), either the process of the steps #6 and #7 or the process of the step #8 is executed based on each code in the execution position. Then, values that are counted down are stored one by one in the operating point table TLP.

When the execution of the module 1M is finished (Yes in #9), the module execution monitoring portion 102 checks whether or not a value in the lowest field of the operating point table TLP is "0" (#10). If the value is "0" (Yes in #11), it is decided that the module 1M has been executed normally (#12).

On the contrary, if the value is not "0" (No in #11), the module execution monitoring portion 102 decides that the module 1M has not been executed normally, and the abnormal response processing portion 104 performs the process for dealing with the abnormal state of the module 1M (#13). As such a process, for example, the abnormal response processing portion 104 performs a process of informing an administrator of generation of the abnormal state, a process of identifying which abnormal state is generated in which location, a process of stopping execution of other modules 1M related to the module 1M, a process of recovering set values of hardware or software to the state before the execution of the module 1M or the like. After the abnormal response processing portion 104 performed these processes, the register table managing portion 103 stores "0" in the lowest field of the operating point table TLP (#14).

Figure 6:
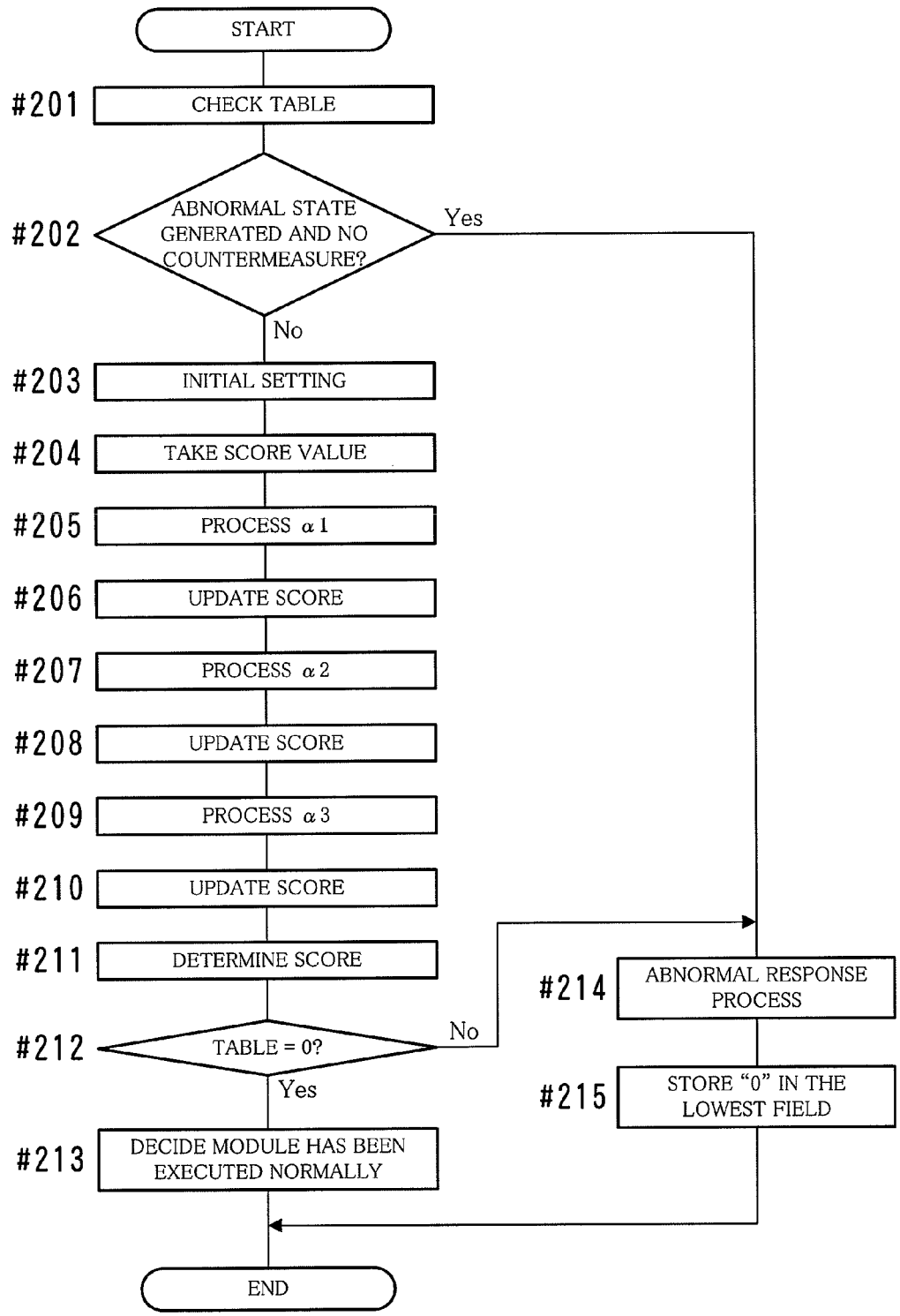
FIG. 6 is a flowchart for explaining an example of a flow of a process of the computer when it monitors the module having the structure shown in FIG. 3.

FIG. 6 is a flowchart for explaining an example of a flow of a process of the computer 1 when it monitors the module 1M having the structure shown in FIG. 3, and FIGS. 7A-7E are diagrams showing an example of a variation of the operating point table TLP.

Here, a flow of a concrete process of the module execution monitoring portion 102, the register table managing portion 103 and the abnormal response processing portion 104 will be described with reference to the flowchart shown in FIG. 6 and transitions of the operating point table TLP and the like shown in FIGS. 7A-7E by using the example in the case where the module 1M shown in FIG. 3 is executed.

As described above in the step #1 of FIG. 5, the module execution monitoring portion 102 first checks whether or not the process for dealing with the abnormal state was performed when the abnormal state was generated while the module 1M was executed last time, by referring to the operating point table TLP of the module 1M (#201).

If the process for dealing with the abnormal state was not performed in spite of the occurrence of the abnormal state (Yes in #202), the abnormal response processing portion 104 performs the process (#214), and the register table managing portion 103 stores "0" in the lowest field of the operating point table TLP (#215).

Figures 7A, 7B:
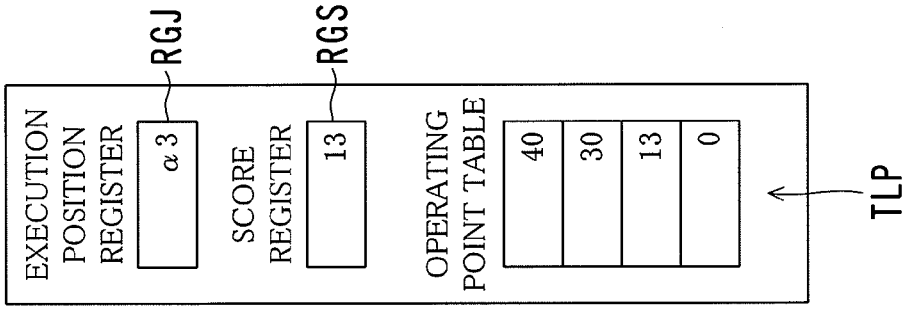
FIGS. 7A-7E are diagrams showing an example of a variation of an operating point table.

On the contrary, if the process was performed or if the abnormal state had not been generated while the module 1M was performed last time (No in #202), the execution position register RGJ, the score register RGS and the operating point table TLP of the module 1M are reset as shown in FIG. 7A (#203), and the score value 3S of the score code 2S of the module 1M, i.e., "40" is stored in the leading field of the operating point table TLP as shown in FIG. 7B (#204).

Figure 7C:
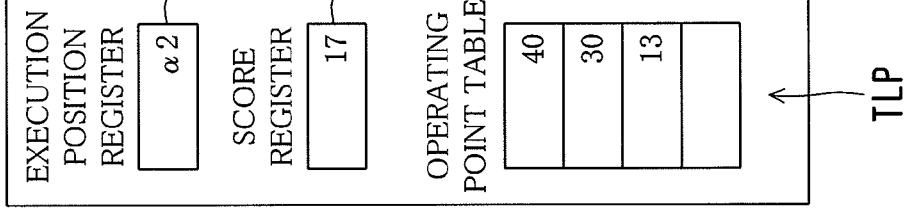

After starting the execution of the module 1M, according to the source codes shown in FIG. 3, the process α1 is first performed based on a group of codes for the process α1 (#205). Then, the register table managing portion 103 refers to the operating point code 2P1 that is described in the part next to the group of codes, and it subtracts the operating point value 3P1 of the operating point code 2P1, i.e., "10" from the value in the lowest field of the operating point table TLP as shown in FIG. 7B. The value obtained by the subtraction is stored in the next lower field as shown in FIG. 7C (#206). On this occasion, information that indicates the execution position and the operating point value 3P1 thereof are stored in the execution position register RGJ and the score register RGS, respectively.

Figure 7D:
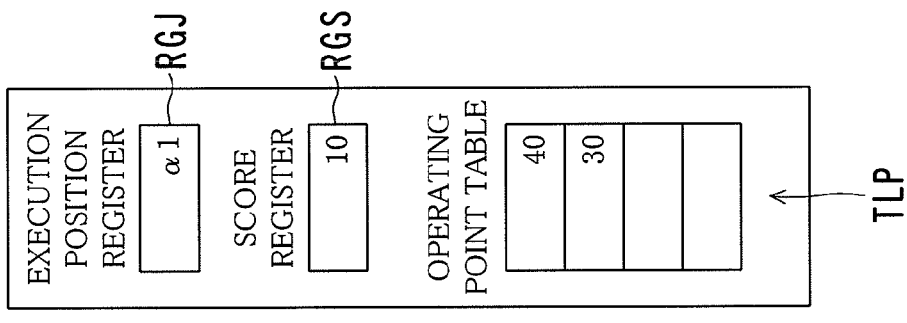

Further, according to the source codes shown in FIG. 3, the process α2 is performed based on a group of codes for the process α2 (#207). Then, the register table managing portion 103 refers to the operating point code 2P2 that is described in the part next to the group of codes, and it subtracts the operating point value 3P2 of the operating point code 2P2, i.e., "17" from the value in the lowest field of the operating point table TLP shown in FIG. 7C. The value obtained by the subtraction is stored in the next lower field as shown in FIG. 7D (#208). On this occasion, information that indicates the execution position and the operating point value 3P2 thereof are stored in the execution position register RGJ and the score register RGS, respectively.

Figure 7E:
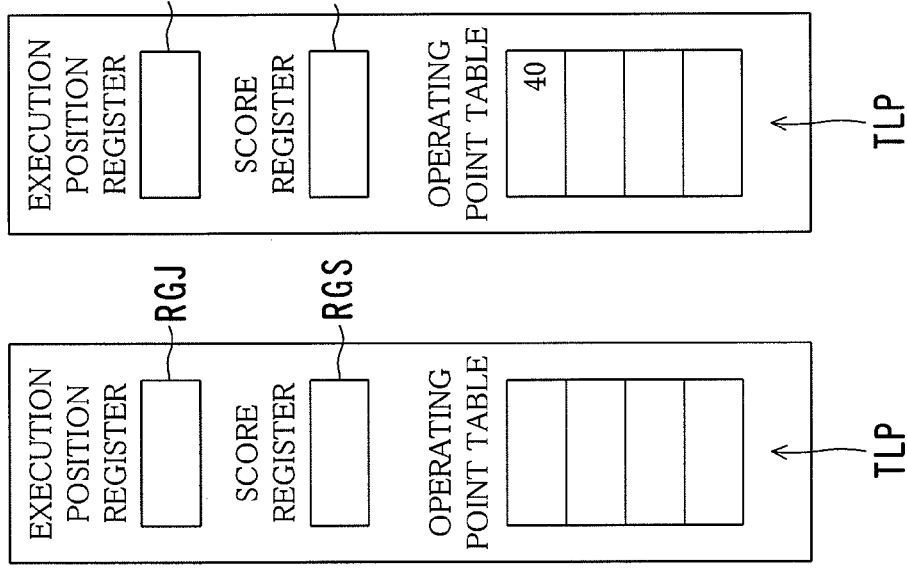

Further, after the process α3 is performed in the same manner (#209), the register table managing portion 103 refers to the operating point code 2P3 that is described in the next part, and it subtracts the operating point value 3P3 of the operating point code 2P3, i.e., 13" from the value in the lowest field of the operating point table TLP shown in FIG. 7D. The value obtained by the subtraction is stored in the next lower field as shown in FIG. 7E (#210). On this occasion, information that indicates the execution position and the operating point value 3P3 thereof are stored in the execution position register RGJ and the score register RGS, respectively.

When the process based on the module 1M is finished, the module execution monitoring portion 102 checks whether or not a value of the lowest field of the operating point table TLP is "0" (#211). If the value is "0" (Yes in #212), it is decided that the module 1M has been executed normally (#213).

If the value is not "0" (No in #212), it is decided that a certain abnormal state was generated during the execution of the module 1M. Then, the abnormal response processing portion 104 performs the process for dealing with the abnormal state (#214), and the register table managing portion 103 stores "0" in the lowest field of the operating point table TLP (#215).

The abnormal response processing portion 104 can estimate which abnormal state was generated in which location of the module 1M, based on the value in the lowest field of the operating point table TLP. For example, if the value is "10", it can estimate that the process a1 was not performed but the process jumped to the group of codes for the process α2. Further, if the value is "−10", it can estimate that the process α1 is performed for additional one time by an invalid loop.

In order to facilitate this estimation, it is desirable to arrange so that the operating point values 3P of the operating point codes 2P that are described in one module 1M are different from each other like the operating point values 3P1, 3P2 and 3P3 shown in FIG. 3, for example. Further, it is desirable to arrange so that these operating point values 3P are prime to each other. If the number of times of looping is large, it is desirable to set values that are larger than the number of times and are prime to each other. Alternatively, it is desirable to set numerical values having different orders like "1", "100" and "10000", for example, for the operating point values 3P1, 3P2 and 3P3, respectively.

[The Case where the Plurality of Modules 1M are Executed in Parallel]

As described above, the module switch control portion 101 switches modules 1M to be executed by the CPU 10a as necessity, when a plurality of modules 1M are activated to be executed. In this case, the module execution monitoring portion 102, the register table managing portion 103 and the abnormal response processing portion 104 perform the processes described above for each of the activated modules 1M. Hereinafter, contents of processes of the individual portions shown in FIG. 2 will be described with reference to an example of the case where the modules 1M1, 1M2 and 1M3 are activated and executed simultaneously.

The register table managing portion 103 prepares and manages a combination of the execution position register RGJ, the score register RGS and the operating point table TLP as described above with reference to FIG. 4, for each of the modules 1M1, 1M2 and 1M3.

Since there is the single CPU 10a as described above, a plurality of modules 1M cannot be executed at the same time. Only the module 1M that is selected by the module switch control portion 101 is executed.

When the module switch control portion 101 selects a certain module 1M to be executed, the register table managing portion 103 stores identification information of the module 1M (e.g., a name of the module) in the active module register RGM. If certain identification information is already stored, it is overwritten. For example, identification information of the module 1M2 is stored in the active module register RGM, and the module switch control portion 101 selects the module 1M1 as a new module to be executed. Then, the identification information of the module 1M2 is replaced with the identification information of the module 1M1.

The module execution monitoring portion 102, the register table managing portion 103 and the abnormal response processing portion 104 perform the monitoring process described above with reference to FIG. 5 and other drawings for each of the modules 1M1, 1M2 and 1M3 in a parallel manner. However, the plurality of processes cannot be performed at the same time in this case too. Therefore, the monitoring process of the module 1M that is currently indicated in the active module register RGM is performed, and the monitoring processes of other modules 1M are stopped temporarily.

[The Case where the Module Includes a Sub Module]

Figure 8:
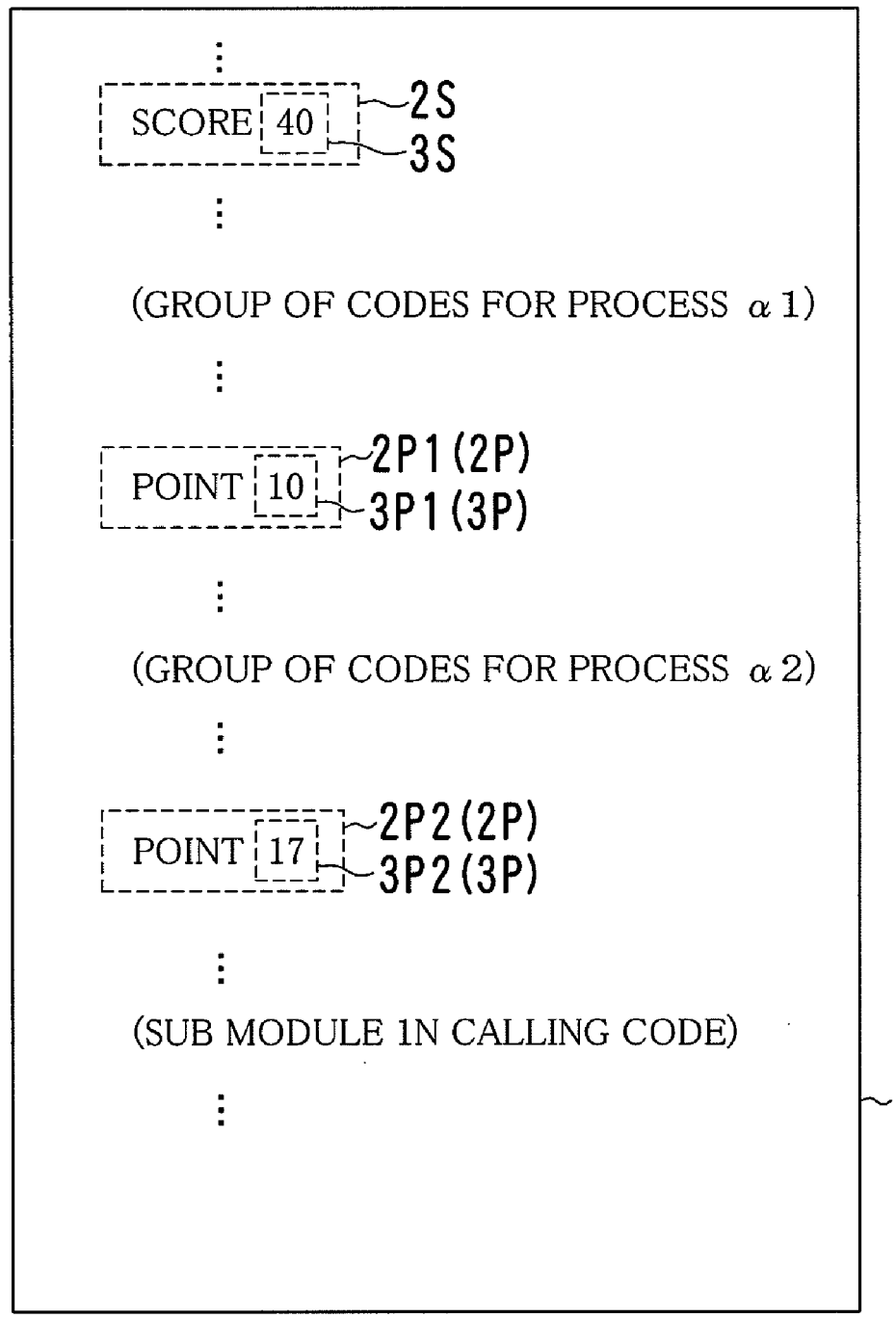
FIG. 8 is a diagram showing an example of a structure of a module in the case where it includes a sub module.
Figure 9:
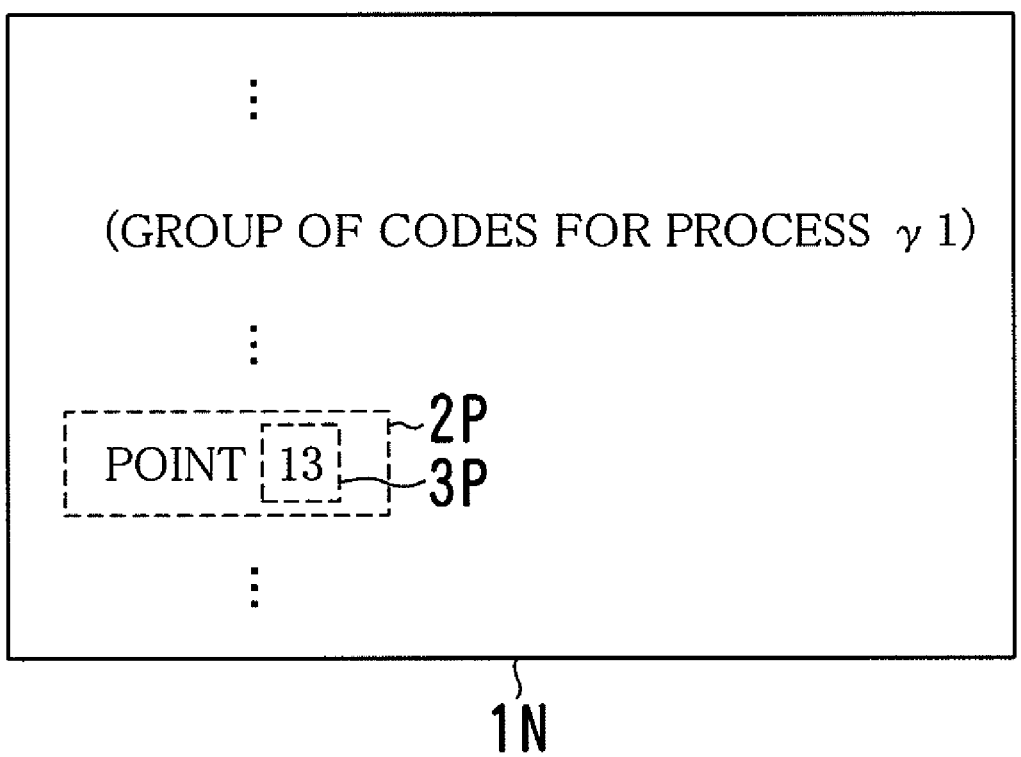
FIG. 9 is a diagram showing an example of a structure of the sub module.
Figure 10:
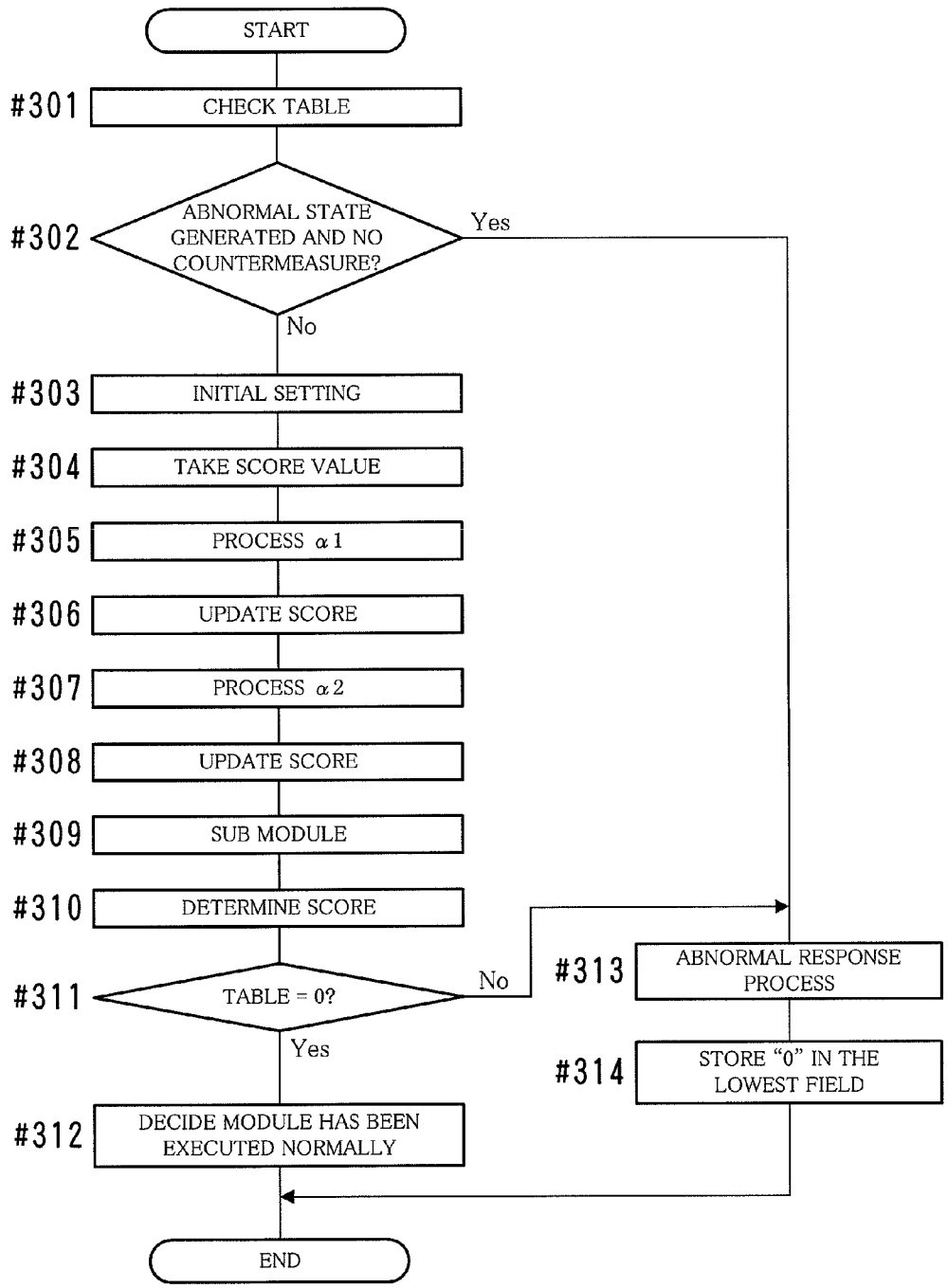
FIG. 10 is a flowchart for explaining an example of a flow of a process of a computer when it monitors the module having the structure shown in FIG. 8.
Figure 11:
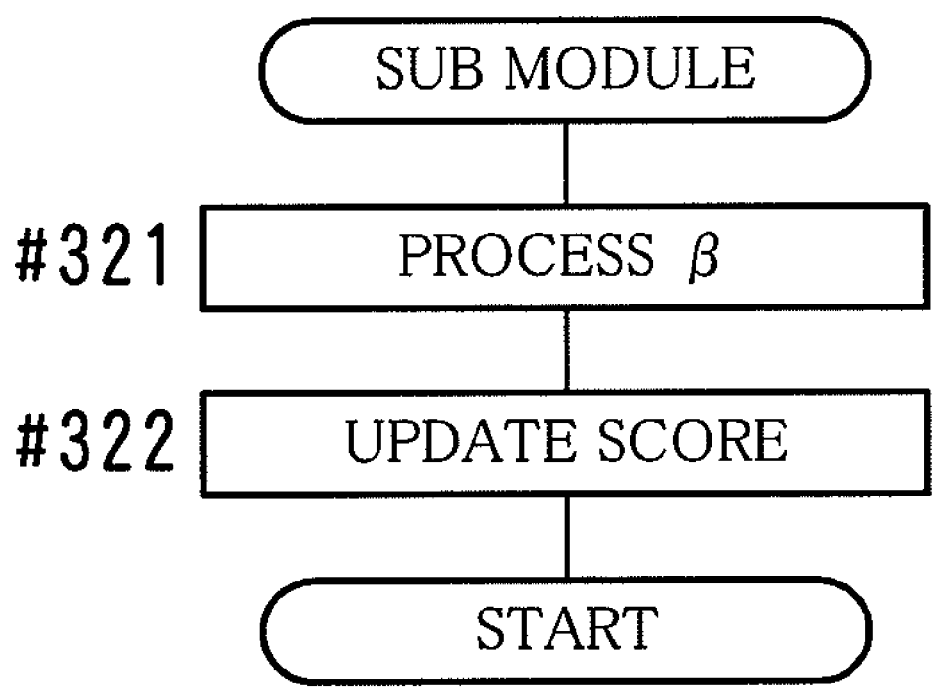
FIG. 11 is a flowchart for explaining an example of a flow of a process of the computer while it is executing the sub module having the structure shown in FIG. 9.

FIG. 8 is a diagram showing an example of a structure of the module 1M in the case where it includes a sub module, FIG. 9 is a diagram showing an example of a structure of the sub module 1N, FIG. 10 is a flowchart for explaining an example of a flow of a process of the computer 1 when it monitors the module 1M having the structure shown in FIG. 8, and FIG. 11 is a flowchart for explaining an example of a flow of a process of the computer 1 while it is executing the sub module 1N having the structure shown in FIG. 9.

As shown in FIG. 8, there is a case where the module 1M includes a code for calling the sub module 1N shown in FIG. 9 as a subroutine. In this case, in order to monitor whether or not the sub module has been executed normally, the operating point code 2P should be described in the module 1M in association with the code for calling the sub module.

Further, in this case, the module execution monitoring portion 102, the register table managing portion 103 and the abnormal response processing portion 104 perform the process for monitoring execution of the module 1M in the procedure as shown in FIGS. 10 and 11.

In FIG. 10, the process of the steps #301 to #308 is the same as the process of the steps #201 to #208 as described above with reference to FIG. 6, so description thereof will be omitted. In accordance with the description of the module 1M, the processes α1 and α2 are performed, and then the sub module 1N is called and executed as the conventional manner.

Then, the process β is performed in accordance with the codes described in the sub module 1N (#321 in FIG. 11). Then, the register table managing portion 103 subtracts the operating point value 3P of the operating point code 2P described in the sub module 1N from the value in the lowest field of the operating point table TLP of the module 1M, and the value obtained by the subtraction is stored in the next lower field (#322).

With reference to FIG. 10 again, when the execution of the sub module 1N is finished and further the execution of the module 1M is finished, it is decided whether or not the module 1M including the sub module 1N has been executed normally. If there is an abnormal state, the process for dealing with the abnormal state is performed (#310-#314). Contents of these processes are the same as the contents of the processes of the steps #211-#215 in FIG. 6 described above.

According to the present embodiment, the score code 2S and the operating point code 2P are embedded in one module 1M. Then, whether or not the module 1M has been executed normally is decided by referring only to the total sum of the operating point values 3P of the operating point codes 2P indicated in the execution position and the score value 3S of the score code 2S. Therefore, it is able to monitor more easily than the conventional method whether or not one program has been executed normally.

Even if there is generated an abnormal state such as an abnormal loop or unexecuted state of a code to be executed logically, the abnormal state can be detected. In addition, it is estimated easily which abnormal state is generated in which location. Even if the module includes a sub module, they are easily estimated. In other words, the present embodiment can support logical matching of call and return.

Even if the computer adopts multitasking, multi-thread or the like, it can perform the monitoring process with little influence to the execution of the primary module 1M (program). Even if many modules 1M are executed in the same time period, waste of resources of the computer 1 can be suppressed because it is sufficient to increase the counters, i.e., the operating point tables TLP in accordance with the number of the modules 1M. It is also easy to specify which module 1M generated the abnormal state.

Although the present embodiment describes the case where a personal computer or a workstation is used as the computer 1, the present invention can be applied to other form of the computer. For example, the present invention can be utilized for monitoring whether or not firmware (a built-in program) has been executed normally, which is built in a router, a modem, a navigation terminal, a mobile phone terminal, a program controlled home appliance, a personal digital assistant (PDA) or the like.

Although the present embodiment describes the example of the case where a unit of the program is a "module", the present invention can be also used for monitoring a unit of program that is larger than the module, like an "application".

If the module 1M includes a branch or a loop, the process to be executed or the number of times of execution may be different depending on conditions. Then, if there is only one score value 3S, the value in the lowest field of the operating point table TLP may not become "0" despite of the normal execution of the module 1M. Therefore, it is possible to prepare a plurality sets of the score value 3S and the operating point table TLP in accordance with the process that is expected to be performed or the number of times of the execution, and to perform the countdown for every score value 3S. If any one of them becomes "0", it can be decided that the module 1M has been executed normally. If it becomes a numerical value except all "0", it can be decided that an abnormal state is generated.

Although the present embodiment performs the subtraction of the operating point value 3P corresponding to the performed process from the score value 3S, and decides whether or not the module 1M has been executed normally, based on whether or not the numerical value remaining after the execution of the module 1M has become "0", other methods may be used for the decision. For example, it is possible to calculate a total sum of the operating point value 3P corresponding to the performed process. If the total sum matches the score value 3S, it can be decided that the module 1M has been executed normally. If they don't match each other, it can be decided that an abnormal state has been generated.

Although the present embodiment decides whether or not the module 1M has been executed normally after it has been executed, it is possible to adopt a structure in which the operating point table TLP is monitored also while the module 1M is executed, and when the value in the lowest field thereof becomes below "0", it is decided that an abnormal state is generated. In addition, it is possible to display states of variations of the execution position register RGJ, the score register RGS and the operating point table TLP in real time on the display 11. Alternatively, it is possible to record history of these states of variations in a log file and to display the states of variations on the display 11 based on the log file after the execution of the module 1M is finished.

Although the present embodiment describes the example of a so-called single CPU computer 1, the present invention can be applied to a dual CPU computer.

Other than that, the structure of the entire or each portion of the computer 1, and the structure of the module 1M, the computer language, the process contents, the process order, the structure of the table and the like of the module 1M can be modified as necessity in accordance with the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A program monitoring method for monitoring whether or not a program has been executed normally, the method comprising:
describing codes indicating first numerical values in one or more locations of the program in advance, the first numerical values being different from one another;
counting, by a counter, a plurality of the first numerical values indicated in one of the codes if an execution position of the program corresponds to a location of said one of the codes; and
deciding that the program has not been executed normally if a difference between a numerical value counted by the counter and a second numerical value is not equal to a predetermined numerical value.

2. The program monitoring method according to claim 1, wherein
the counter is prepared for each of a plurality of programs that are executed in the same time period.

3. The program monitoring method according to claim 1, wherein the codes are described in locations designated by a user.

4. The program monitoring method according to claim 1, further comprising outputting information on a change in state of the counter.

5. A computer comprising:
storage unit that stores a program in which codes indicating first numerical values are described in one or more locations, the first numerical values being different from one another;
and a processor that executes the program and performs:
counting a plurality of the first numerical values indicated in one of the codes if an execution position of the program corresponds to a location of said one of the codes; and
deciding that the program has not been executed normally if a difference between a counted numerical value and a second numerical value is not equal to a predetermined numerical value.

6. An abnormal monitoring program embodied in a non-transitory computer-readable medium, the abnormal monitoring program comprising instructions to cause a computer to perform:
describing codes indicating first numerical values in one or more locations of a program in advance, the first numerical values being different from one another;
counting a plurality of the first numerical values indicated in one of the codes if an execution position of the program corresponds to a location of said one of the codes; and
deciding that the program has not been executed normally if a difference between a counted numerical value and a second numerical value is not equal to a predetermined numerical value.

* * * * *